United States Patent [19]
Ousset

[11] 3,744,817
[45] July 10, 1973

[54] COMBINATION STEERING-WHEEL AND SAFETY DEVICE FOR AUTOMOTIVE VEHICLE

[75] Inventor: Jacques Ousset, Billancourt, France

[73] Assignees: Regie Nationale Des Usines Renault, Billancourt; Automobiles Peugeot, Paris, France

[22] Filed: June 28, 1971

[21] Appl. No.: 157,461

[30] Foreign Application Priority Data
July 28, 1970 France .............................. 7027761

[52] U.S. Cl. ........................ 280/150 AB, 280/87 R
[51] Int. Cl. .......................................... B60r 21/08
[58] Field of Search .................. 280/150 AB, 150 B, 280/87; 180/78; 74/522

[56] References Cited
UNITED STATES PATENTS
2,899,214 8/1959 D'Antini .................. 280/150 AB X Primary Examiner—Kenneth H. Betts
Assistant Examiner—David M. Mitchell
Attorney—Stevens, Davis, Miller & Mosher

[57] ABSTRACT

Device comprising the combination of a steering wheel with a safety device of the type comprising a flexible inflatable bladder and a steering mechanism in which the axis of the steering column and the axis of rotation of the steering wheel are separate, the safety device is disposed inside the surface described by any one of the arms connecting the rim of the steering wheel to the hub thereof, and said hub surrounds a fixed tubular support of the safety device and constitutes the shaft of the steering mechanism driving system.

3 Claims, 5 Drawing Figures

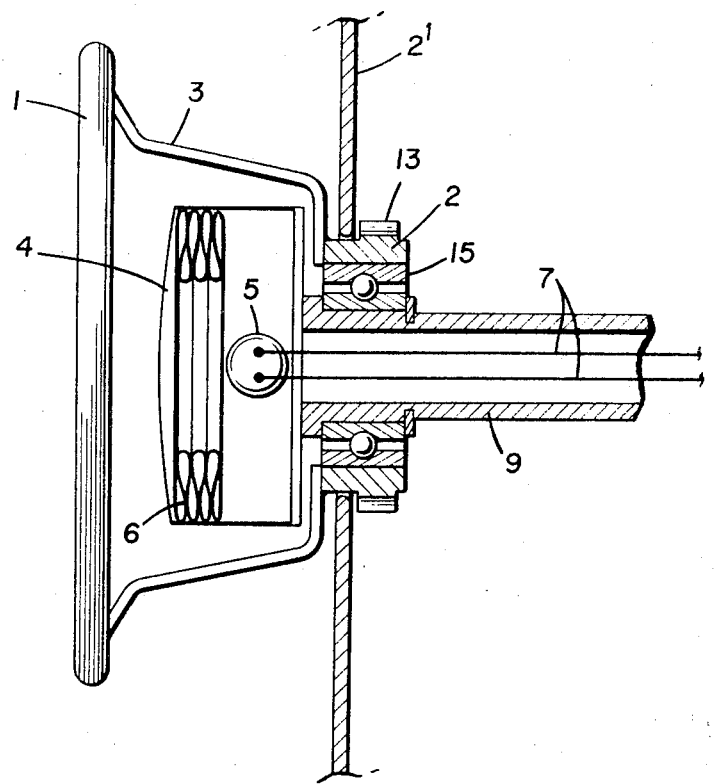
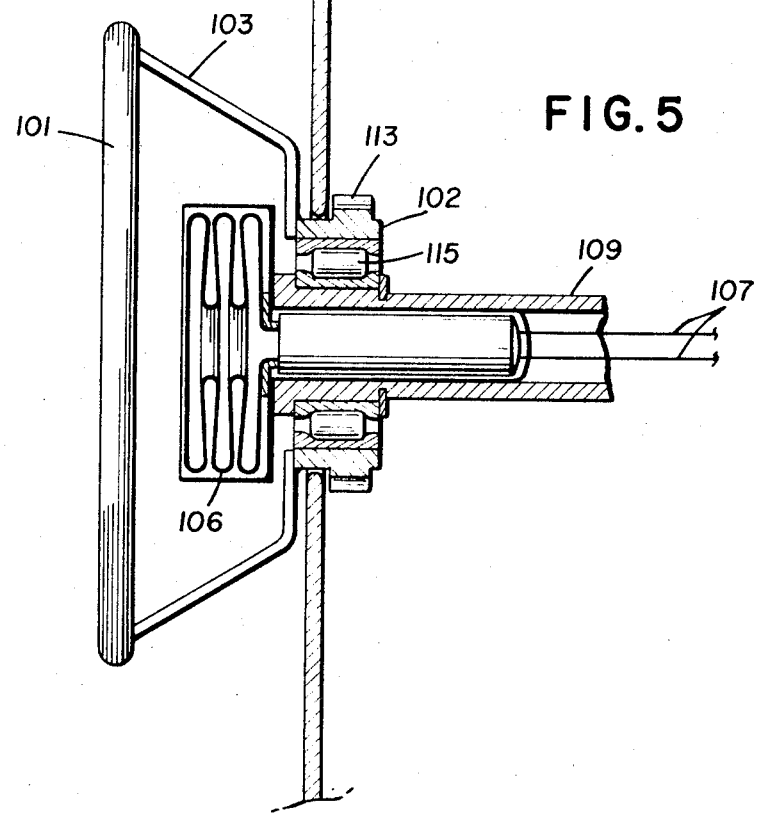

COMBINATION STEERING-WHEEL AND SAFETY DEVICE FOR AUTOMOTIVE VEHICLE

The present invention relates in general to safety devices of the type intended for protecting the passengers of a motor vehicle in case of crash, and more particularly to a safety device of the type comprising an inflatable, flexible bladder, normally collapsed or flattened, and adapted to be inflated at the proper time for preventing shocks between the passengers and the inner elements of the passengers' compartment of the vehicle. When a crash takes place, the passengers and driver of the vehicle strike the inflated bladder and their movements are damped by this bladder.

A known proposition aiming at protecting the passengers of motor vehicles consisted in incorporating devices of this character in a wall secured to the inner space of the vehicle and constituting an integral element of the general upholstery thereof. Means coacting with this wall, for example an element of the instrument panel or facia, or of a seat, are adapted to move said wall from its normal mounting position to the passenger and/or driver in order to protect them during a crash. In the particular case of the driver, his protection implies the mounting of the same devices in the steering wheel or in the hub thereof. Thus, according to this method, shock-absorbing devices have been incorporated in the steering wheel for protecting the driver's chest and forming a shock-damping surface projecting from the rim of the steering wheel.

The efficiency of these devices increases if the rim of the steering wheel lies in a substantially vertical plane substantially parallel to the driver's chest. When the steering wheel is more or less inclined, it is obvious that the driver's chest cannot properly engage the outer surface of the inflated bladder. Under these conditions, the driver's weight is distributed over a relatively reduced surface area of the flexible inflated bladder and the relatively considerable pressure per surface unit thus produced is much more detrimental to the driver than to the passengers. Therefore, it is most likely that in case of crash the driver will knock the inner walls of the vehicle or the steering wheel.

The present invention relates to a combined arrangement of a steering wheel and a safety device in the form of an inflatable flexible bladder, whereby the above-mentioned inconveniences are eliminated, this arrangement comprising more particularly a safety device which is fixed in relation to the steering wheel and adapted when inflated to expand in a direction somewhat inclined in relation to the normal axis of rotation of the steering wheel.

The present invention is also concerned with a safety device of the type broadly set forth hereinabove but swivel-mounted so that it can be adapted to the particular stature of the driver.

It is an additional object of this invention to provide a compact safety device that can easily be inspected or replaced, and does not interfere with the moment of inertia of the steering wheel and therefore with the road behaviour of the vehicle.

A complementary object of this invention consists in providing a safety device safely protected from shocks likely to be exerted against the steering mechanism.

To this end, the steering wheel and safety device arrangement according to this invention is characterized in that the safety device is disposed within the surface described by at least one of the arms connecting the rim of the steering wheel to the tubular hub thereof, and that said hub surrounds a fixed tubular support of the safety device and constitutes the control shaft of the steering mechanism.

An exemplary form of embodiment and a variation of the safety device according to this invention will now be described by way of illustration with reference to the attached drawing, in which:

FIG. 4 is a sectional view taken along line IV—IV of FIG. 1, FIG. 5 is a sectional view taken along line V—V of FIG. 2.

Figure 1:
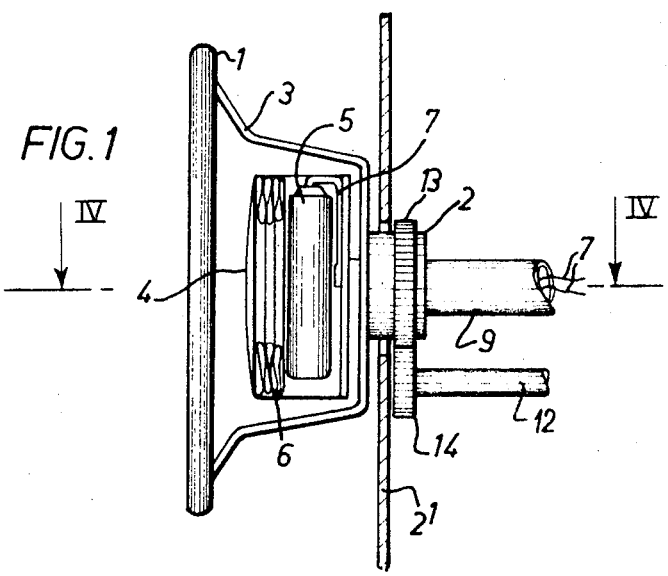
FIG. 1 is a side elevational view of the device.
Figure 2:
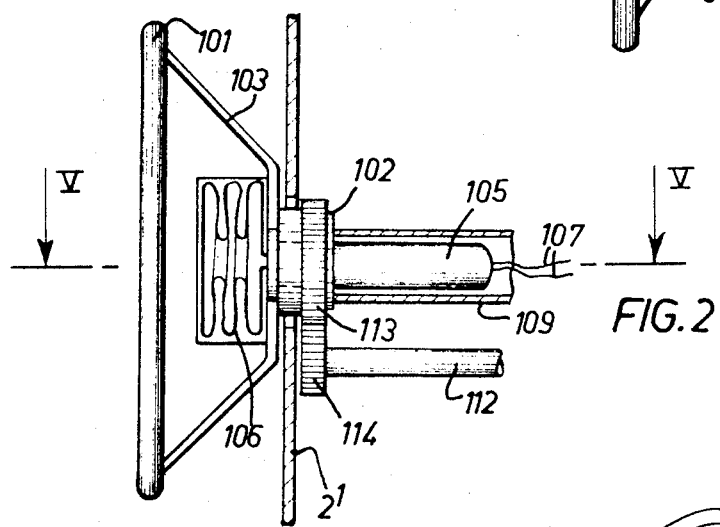
FIG. 2 is a similar view showing a modified form of embodiment, with parts shown in section.
Figure 3:
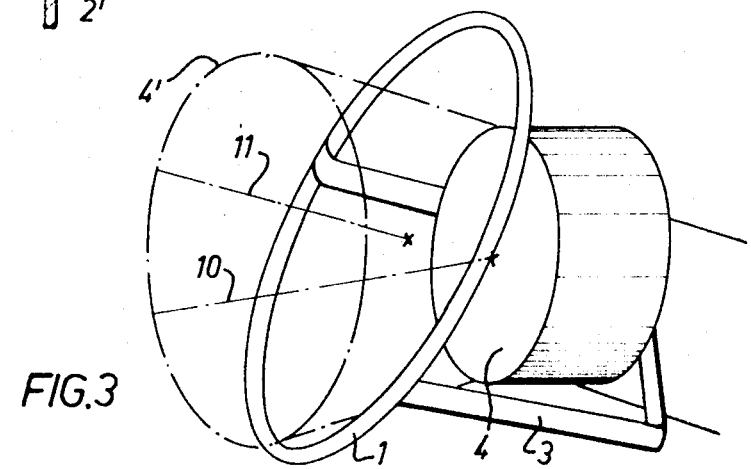
FIG. 3 is a perspective view of the device.

In FIG. 1 the steering wheel comprises a rim 1 connected to a tubular hub 2 (rotatably mounted through a wall or facia 2¹) by means of a pair of arms 3 shaped to provide therebetween and ahead of the hub 2 a cavity inside the steering wheel for receiving the safety device proper designated by the reference numeral 4 and comprising an inflation cartridge 5 and an inflatable bladder 6 (shown in its collapsed position in FIG. 1). It is clear that it is only necessary that the safety device be positioned inside the surface bounded by anyone of the arms 3 during the steering wheel rotation. Conducting wires 7 extending through a fixed tubular support 9 connect the cartridge 5 to a detector (not shown since it is no part of the present invention). It will be noted however that the detector is adapted to transmit for example an electric signal, as a consequence of a crash or in case of very sudden and fierce deceleration of the vehicle, so as to fire an explosive charge and open the inflation cartridge 5. As shown in FIGS. 1 and 2, when the vehicle operates normally the bladder 6 is folded or collapsed to constitute a compact body of relatively reduced dimensions. In case of collision, crash, accident or other abnormal circumstances, the detector enables the fluid under pressure contained in the cartridge 5 to inflate the bladder 6 and therefore to expand in a direction 10 (FIG. 3) shifted angularly in relation to the axis of rotation 11 of the steering wheel. The dash and dot line 4' designates the outer contour of the bladder in its inflatted condition.

The hub 2 of steering wheel 1–3 may be rotatably mounted to the tubular support 9. In the case illustrated in FIG. 1 the hub 2 acts as the driving shaft of a steering column counter-rotation, wherein the conventional steering column proper 12 is driven through a pair of gears 13 and 14 in constant meshing engagement and rigid the former with hub 2 and the latter with column 12, respectively. It will be noted that the steering column 12 may also constitute the driving member of a fully mechanical steering mechanism, or of a servo-controlled steering mechanism. However, in the specific case of a servo-controlled steering mechanism the counter-motion, instead of comprising a pair of meshing pinions, may incorporate control members such as cams or connecting-rods carried by the hub 2 and coacting with the movable assembly of a pressure fluid distributor of the servo-control system.

In the modified form of embodiment illustrated in FIG. 2 the component elements are designated by the same reference numerals plus 100. The inflation cartridge 105 is housed in the tubular support 109 constituting the shaft of the steering mechanism driving member. This modified arrangement is advantageous in that it reduces appreciably the overall dimensions of the safety device as the latter is partially enclosed in its tubular support 109.

FIG. 4 represents a view taken along line IV–IV of FIG. 1 and illustrates the connection of the pair of arms 3 of the steering wheel to the hub 2 which is able to rotate independently of the fixed safety device 2 which is mounted on tubular support 9. Spacing means 15 keep the hub spaced from the tubular support. FIG. 5, which is taken along line V—V of FIG. 2 illustrates that the tubular shaft 109 supporting the safety device is stationary and fixed with the steering wheel arms 103 connected to hub 102 which rotates about the fixed tubular shaft 109.

Of course, it would not constitute a departure from the present invention to bring various modifications to the specific forms of embodiment described and illustrated herein, as will obviously occur to those conversant with the art.

Thus, more particularly, it would be possible to mount the safety device on a swivel-joint and/or a ramp provided with locking means for adapting the device to the stature of the driver. Furthermore, it will be seen that the safety device illustrated in FIG. 1 may be mounted on a plain bearing in order to obtain a stable position of the device under the influence of the weight of the inflation cartridge.

What is claimed as new is:

1. A steering wheel apparatus with a safety device therein comprising:

a steering wheel, a hub axially offset from said wheel, arms interconnecting said wheel and hub and defining a space axially between said hub and said wheel and radially within said wheel, fixed support means within said hub, a flexible inflatable bladder, means to inflate said bladder, said bladder being attached to said fixed support means and positioned within said space and being expandable from its base so as to create a disc-like surface which in its expandable condition is out of parallelism with the plane of the steering wheel, whereby the protection of the driver is independent of the plane of the steering wheel, a steering column shaft having an axis of rotation which is separate from the axis of rotation of said steering wheel, and means establishing a driving connection between said hub and said steering column shaft.

2. An apparatus according to claim 1, wherein said means to inflate said bladder is within said space.

3. An apparatus according to claim 1, wherein said means to inflate said bladder is within said fixed support means.

* * * * *